US006946990B2

(12) United States Patent
Monk

(10) Patent No.: US 6,946,990 B2
(45) Date of Patent: Sep. 20, 2005

(54) APPARATUS AND METHODS FOR RADOME DEPOLARIZATION COMPENSATION

(75) Inventor: Anthony D. Monk, Seattle, WA (US)

(73) Assignee: The Boeing Company, Chicago, IL (US)

( * ) Notice: Subject to any disclaimer, the term of this patent is extended or adjusted under 35 U.S.C. 154(b) by 54 days.

(21) Appl. No.: 10/625,207

(22) Filed: Jul. 23, 2003

(65) Prior Publication Data

US 2005/0017897 A1 Jan. 27, 2005

(51) Int. Cl.[7] .................................................. G01S 7/40
(52) U.S. Cl. ........................ 342/174; 342/159; 342/188
(58) Field of Search ............................ 342/62, 74, 75, 342/77, 80, 85, 90, 95, 97, 99, 100, 101, 139, 140, 141, 153, 159, 162, 174

(56) References Cited

U.S. PATENT DOCUMENTS

| | | | | | |
|---|---|---|---|---|---|
| 3,314,070 | A | * | 4/1967 | Youngren | 343/708 |
| 3,316,549 | A | * | 4/1967 | Hallendorff | 342/77 |
| 3,805,268 | A | * | 4/1974 | Britt | 343/756 |
| 3,940,767 | A | * | 2/1976 | DeLano et al. | 342/63 |
| 4,456,913 | A | | 6/1984 | Rao et al. | |
| 4,479,128 | A | | 10/1984 | Brunner et al. | |
| 4,486,756 | A | * | 12/1984 | Peregrim et al. | 342/149 |
| 4,499,473 | A | * | 2/1985 | Rao | 343/754 |
| H000173 | H | * | 12/1986 | Claborn et al. | 342/372 |
| 4,901,086 | A | | 2/1990 | Smith | |
| 5,149,011 | A | * | 9/1992 | Gratt et al. | 244/3.19 |
| 5,185,608 | A | | 2/1993 | Pozgay | |
| 5,208,564 | A | * | 5/1993 | Burns et al. | 333/164 |
| 6,181,288 | B1 | * | 1/2001 | Ivanov et al. | 343/756 |
| 6,275,182 | B1 | | 8/2001 | Meierbachtol | 342/174 |

OTHER PUBLICATIONS

A.W. Rudge et al: "Handbook of antenna design" 1983, Peter Peregrinus Ltd., London, UK, XP002299472 p. 521–528; paragraph 14.7.4.

* cited by examiner

*Primary Examiner*—Thomas H. Tarcza
*Assistant Examiner*—Isam Alsomiri
(74) *Attorney, Agent, or Firm*—Harness Dickey & Pierce P.L.C.

(57) ABSTRACT

A method of reducing depolarization of a wireless signal passing through an antenna radome. An angle of incidence of the signal relative to the radome is determined. From the determined angle of incidence, at least one offset to signal depolarization attributable to the radome is determined. The offset is applied to the signal to reduce depolarization of the signal. When the foregoing method is implemented, effects of radome depolarization in transmit and/or receive modes can be substantially reduced or eliminated.

39 Claims, 9 Drawing Sheets

APPARATUS AND METHODS FOR RADOME DEPOLARIZATION COMPENSATION

FIELD OF THE INVENTION

The present invention relates generally to antenna systems and, more particularly, to a system and method for compensating for depolarization of a signal passing through a radome of an antenna system.

BACKGROUND OF THE INVENTION

An antenna system in an aircraft or other vehicle is typically covered by an aerodynamically shaped radome. The antenna system illuminates the radome surface at oblique angles of incidence over at least part of the antenna scan range. Radomes, however, tend to cause depolarization of electromagnetic waves passing through them at oblique incidence. Thus a cross-polarization level of a signal may increase as the signal passes through a radome at an oblique angle.

Radome wall design can be modified, for example, by adjusting thicknesses of the core and central skin to reduce depolarization. Studies have shown, however, that such improvements have only limited effect and may increase transmission loss, radome weight and costs. Thus, there exists a need for a system and method for reducing radome depolarization without entailing radome modification.

SUMMARY OF THE INVENTION

The present invention, in one embodiment, is directed to a method of reducing depolarization of a wireless signal passing through an antenna radome. An angle of incidence of the signal relative to the radome is determined. From the determined angle of incidence, at least one offset to signal depolarization attributable to the radome is determined. The offset is applied to the signal to reduce depolarization of the signal.

The present invention, in another embodiment, is directed to a method of compensating for depolarization of a signal passing through an antenna radome. The signal is divided into a plurality of polarized signals. The method includes applying, to at least one of the polarized signals, at least one offset predetermined to compensate for depolarization attributable to the radome.

In yet another embodiment, the invention is directed to an apparatus for compensating for depolarization of a wireless signal attributable to passage of the signal through an antenna radome. The apparatus includes a polarizer circuit configured to divide the wireless signal into oppositely polarized signals. The apparatus also includes a processor configured to determine at least one offset to the polarized signals that compensates for depolarization attributable to the radome. The apparatus also includes an applicator circuit configured to apply the offset to at least one of the polarized signals.

In still another embodiment, an antenna system includes a radome through which a wireless signal is configured to pass. A polarizer circuit is configured to divide the wireless signal into oppositely polarized signals. A processor is configured to determine at least one offset to the polarized signals that compensates for depolarization attributable to the radome. An applicator circuit is configured to apply the offset to at least one of the polarized signals.

The present invention, in another embodiment, is directed to a polarization controller for controlling polarization of a wireless signal passing through an antenna having a radome. The controller includes a signal divider that divides the signal into oppositely polarized signals, an adjustment circuit that applies a variable differential phase shift to the signals in accordance with a desired linear polarization plane orientation angle, and at least one processor configured to: determine an angle of incidence of the signal relative to the radome; determine, from the determined angle of incidence, at least one offset to signal depolarization attributable to the radome; and control the adjustment circuit so as to apply the offset to the signal.

When an embodiment of the present invention is implemented, effects of radome depolarization in transmit and/or receive modes can be substantially reduced or eliminated.

BRIEF DESCRIPTION OF THE DRAWINGS

The present invention will become more fully understood from the detailed description and the accompanying drawings, wherein.

DETAILED DESCRIPTION OF THE INVENTION

The following description of embodiments of the present invention is merely exemplary in nature and is in no way intended to limit the invention, its application, or uses. Although embodiments of the present invention are described herein in connection with an aircraft antenna system, it should be noted that the invention is not so limited. The present invention can be practiced in connection with radome-enclosed antenna systems on other platforms, for example, ships and ground vehicles. Embodiments also are contemplated relating to fixed ground-based antenna systems. It also should be noted that the present invention can be practiced in connection with a plurality of antenna types, including but not limited to array antennas, reflector antennas, and/or lenses.

Figure 1:
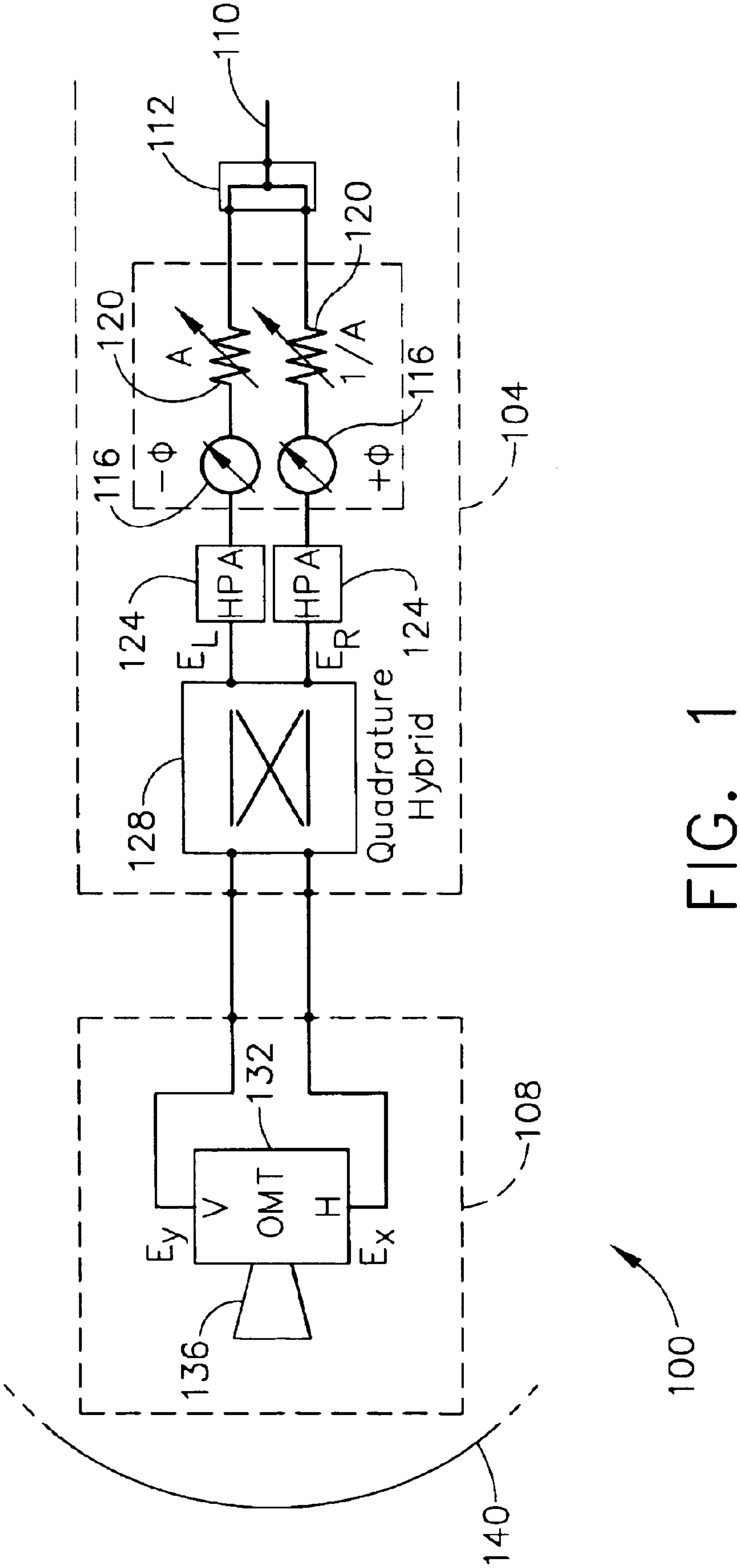
FIG. 1 is a block diagram of a polarization control apparatus that provides radome depolarization compensation according to one embodiment of the present invention.

A polarization control apparatus that provides radome depolarization compensation according to one embodiment of the present invention is indicated generally in FIG. 1 by reference number 100. Although the apparatus 100 is described below in the context of signal transmission, the apparatus 100 shown in FIG. 1 compensates in another embodiment for radome depolarization of a received signal. In yet another embodiment, the polarization control apparatus shown in FIG. 1 compensates for depolarization of signals on both sides of a radome, i.e., the apparatus 100 compensates for radome depolarization of both transmitted and received signals.

The apparatus 100 includes a control unit 104 that delivers signals, e.g., for transmission through an antenna aperture 108. A wireless signal, e.g., a low-level RF signal, entering the apparatus 100 at a port 110 is divided by a divider 112 into left-handed and right-handed circularly polarized (LHCP and RHCP) signals $E_L$ and $E_R$. The signals $E_L$ and $E_R$ pass through variable phase shifters 116 and variable attenuators 120. The signals $E_L$ and $E_R$ are adjusted, via phase shifters 116, with a variable differential phase shift related to a desired linear polarization plane orientation angle of a resulting combined signal. To generate linear polarization, for example, at an angle "a", the phase shifters 116 are set, for example, to produce a phase shift "b" in accordance with b=a−45°. Additionally, as further described below, the foregoing settings of the phase shifters 116 are adjusted and the attenuators 120 are set, in accordance with one embodiment of the present invention, to compensate for radome depolarization.

The signals $E_L$ and $E_R$ are boosted by high-power amplifiers 124 and linearly polarized via a quadrature hybrid 128. Vertical and horizontal signals $E_y$ and $E_x$ are transmitted to an ortho-mode transducer 132 and transmitted through an antenna feed horn 136. As the signals are transmitted, they pass through a radome 140. Generally, however, signals passing through a radome at oblique angles tend to become depolarized to some degree, with depolarization tending to increase as angle obliqueness increases.

Generally, a signal can be said to be TE-polarized where the signal E-vector is perpendicular to the plane of incidence, and TM-polarized where the signal E-vector is parallel to the plane of incidence. The plane of incidence of a signal passing through a radome can be defined as the plane containing both the incident wave direction vector of the signal and a local normal to the radome wall. A major source of radome depolarization is associated with a difference between radome wall complex transmission coefficients $\tau_{TE}$ and $\tau_{TM}$ (that is, between TE and TM polarization) at oblique incidence. A worst case can be when the incident polarization is aligned at 45° to the plane of incidence, so that the polarization is equally resolved into TE and TM components.

The TE and TM components of a signal can have different attenuation and phase delay through a radome, so that when these components are recombined after passing through the radome wall, the wave can exhibit finite depolarization. A maximum cross-polarization level, $(\tau_{TE}-\tau_{TM})/(\tau_{TE}+\tau_{TM})$, is directly proportional to a difference between complex radome wall transmission coefficients.

As further described below, a method of compensating for depolarization of signals passing through the radome 140 is implemented via the apparatus 100. The apparatus 100 applies, to at least one of the polarized signals, at least one offset predetermined to compensate for depolarization attributable to the radome. Such offset(s) include phase offset(s) and/or amplitude offset(s). The offset(s) are combined with the polarization angle adjustment settings for the phase shifters 116 described above. The phase shifters 116 and/or attenuators 120 apply the combination of polarization angle adjustments and radome depolarization offset(s) to the signal(s). The order of phase shifters 116 and attenuators 120 can be reversed without impacting performance or function.

The foregoing method is described below in greater detail with reference to a polarization control apparatus referred to generally in FIG. 2 by reference number 200. In the present embodiment, the apparatus 200 includes a processor 204 configured to compensate for depolarization of signals passing through a radome 206. It should be noted generally that the present invention can be practiced in connection with many different types of controllers and apparatus for controlling transmitted and/or received signals.

Figure 2:
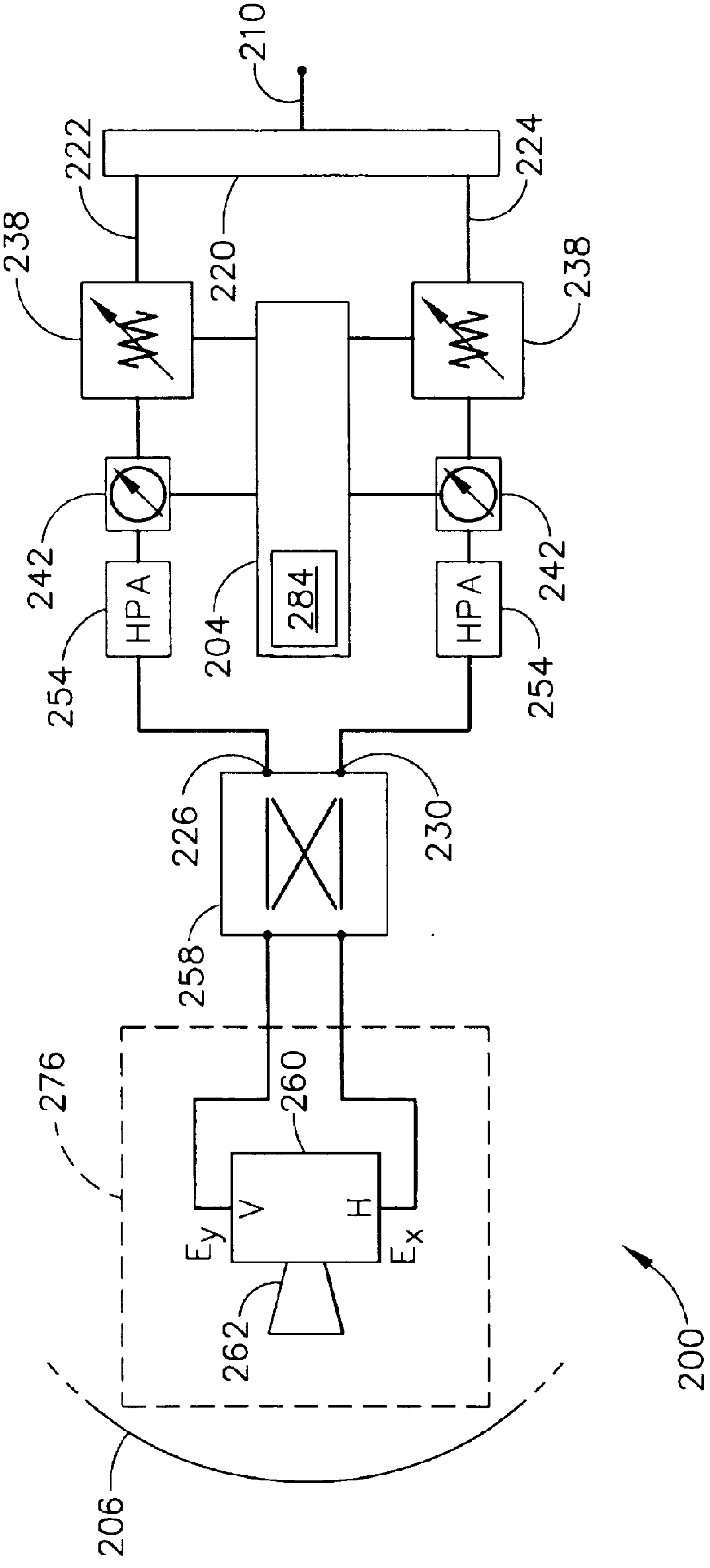
FIG. 2 is a block diagram of a polarization control apparatus according to one embodiment of the present invention.

Referring now to FIG. 2, the apparatus 200 includes an input port 210 for transmit RF input. A power divider 220 divides a signal from the input port 210 into two signals transmitted, via two channels 222 and 224, to step attenuators 238, phase shifters 242, power amplifiers 254, and to a quadrature hybrid 258 through ports 226 and 230. The attenuators 238 and phase shifters 242 receive control input from the processor 204. The processor 204 may include a plurality of processors and may include, but is not limited to, a data transceiver/router (DTR) and/or an antenna control unit (ACU).

When the apparatus 200 is in operation, a low-level RF signal entering the apparatus 200 at the port 210 is divided, preferably equally, by the divider 220. The two resulting signals, left-handed and right-handed circularly polarized (LHCP and RHCP) signals $E_L$ and $E_R$, are adjusted, as previously described with reference to FIG. 1, via attenuators 238 and phase shifters 242. The signals $E_L$ and $E_R$ are boosted by high-power amplifiers 254 and linearly polarized via the quadrature hybrid 258. Vertical and horizontal signals $E_y$ and $E_x$, are transmitted to an ortho-mode transducer 260 and transmitted through an antenna horn 262. As the signals are transmitted, they pass through an antenna aperture 276 and the radome 206.

An embodiment of a method of compensating for depolarization of the signal passing through the antenna radome 206 includes contributing adjustable attenuation in series with adjustable phase shifting to the LHCP and RHCP signals passing between the divider 220 and the output ports 226 and 230. For a specified desired plane of polarization and desired antenna pointing angles, adjustments predetermined to cancel wave depolarization induced by the radome 206 are applied, for example, to the attenuators 238 and phase shifters 242. An algorithm, described below, can be implemented in various embodiments to compensate for signal depolarization attributable to a radome. The algorithm can be implemented in the following manner.

Measurements of the radome 206 are used to generate one or more look-up tables 284 for amplitude and phase offsets to be applied via the processor 204 to cancel radome depolarization. The look-up table(s) 284 are stored in a memory of the processor 204. At a predetermined rate, e.g., at about 10 times per second, the processor 204 retrieves values for amplitude and phase offsets from the table(s) 284 and, for example, computes interpolated values for offsets, as further described below. The processor 204 applies the radome depolarization offsets to amplitude and phase settings being applied to the signals via attenuators 238 and phase shifters 242, until new radome depolarization offset values are retrieved from the table(s) 284.

The foregoing offset values can be calculated based on the following principles. Adjustment of the phase shifters 242 affects the amplitudes of signals $E_X$ and $E_Y$ (also known as $E_H$ and $E_V$) at the antenna OMT 260. Amplitude imbalance between radome transmission coefficients $\tau_{TE}$ and $\tau_{TM}$, typically a minor contributor to radome depolarization, can be compensated for by applying offsets to settings of the phase shifters 242. It can be understood that a radome transmission amplitude imbalance tends to maintain linear polarization, but at an angle skewed from a desired angle. Such polarization skew can be corrected by adjusting a polarization plane via the phase shifters 242.

Adjustment of the attenuators 238 affects the phases of signals $E_X$ and $E_Y$ at the antenna OMT 260. Phase imbalance between radome transmission coefficients $\tau_{TE}$ and $\tau_{TM}$, a major contributor to radome depolarization, can be compensated for by applying offsets to settings of the attenuators 238. It will be understood that a radome transmission phase imbalance tends to maintain a preset polarization angle but converts incident linear polarization to elliptical polarization.

Depolarization of a transmitted signal induced by the radome 206 can be substantially cancelled when one or more offsets are applied to phase shifters 242 and attenuators 238, wherein magnitude(s) of such offset(s) are calculated from radome 206 TE and TM complex transmission coefficients $\tau_{TE}$ and $\tau_{TM}$ (at a given angle of incidence and frequency) and a desired polarization angle and orientation of the plane of incidence of a signal incident upon the radome 206.

Figure 3:
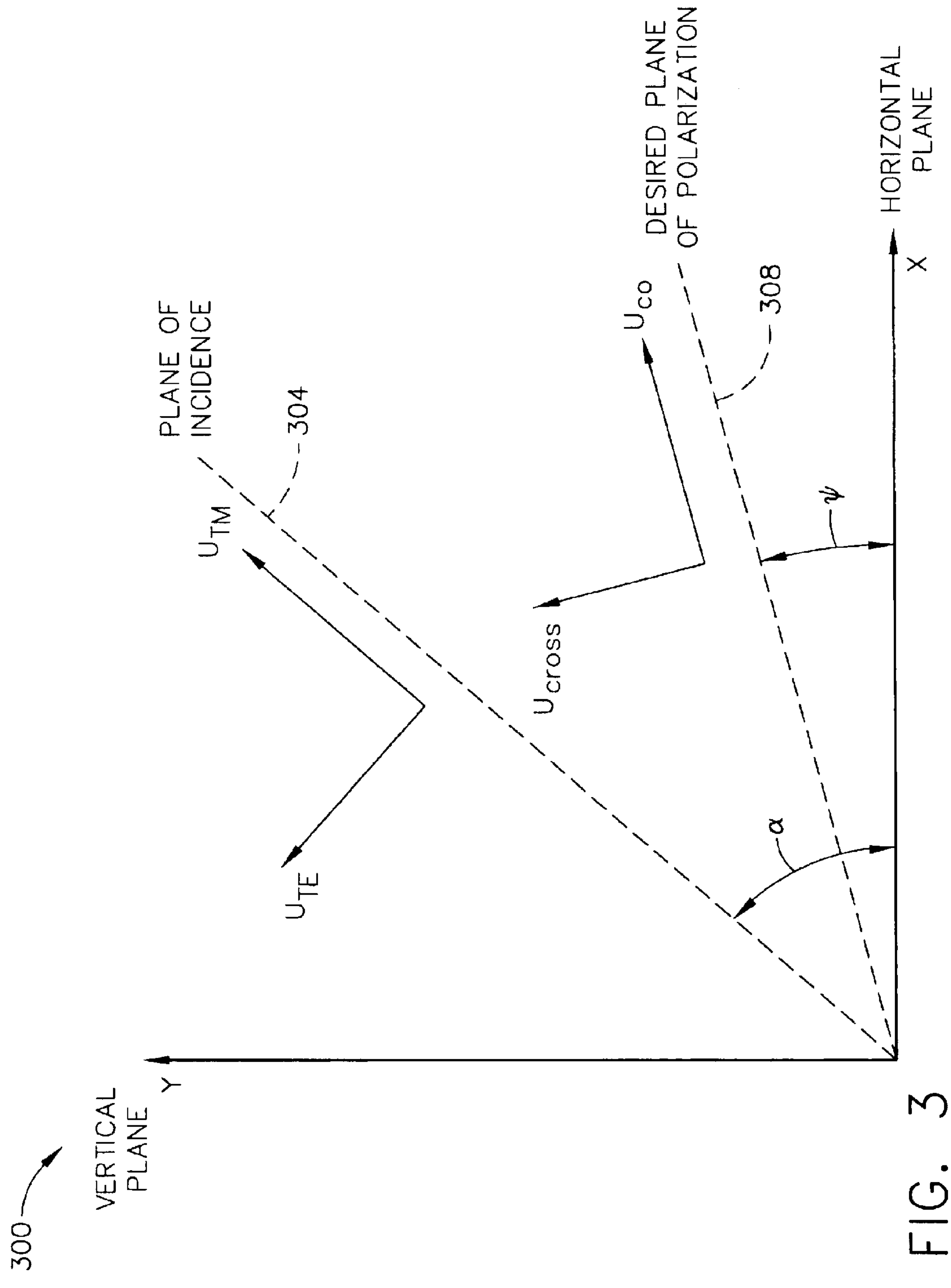
FIG. 3 is a coordinate system in which an exemplary plane of incidence and a plane of polarization are shown.

Offsets can be calculated based on the following principles. A reference coordinate system is indicated generally in FIG. 3 by reference number 300. Referring to FIG. 3, polarization direction vectors $u_{TE}$ and $u_{TM}$ are defined relative to a plane of incidence 304 and cross- and co-polarization direction vectors $u_{CROSS}$ and $u_{co}$ are defined relative to a desired plane of polarization 308. Also shown in FIG. 3 are an angle of incidence a and a desired polarization angle $\psi$.

Generally, an algorithm for determining offsets according to one embodiment includes the following steps. Radome illumination field components $E_X$ and $E_Y$ are calculated in antenna coordinates, based on phase shifter and attenuator settings $\phi$ and A respectively. Radome illumination field components $E_X$ and $E_Y$ are transformed into radome incidence plane coordinates $E_{TE}$ and $E_{TM}$. Radome illumination field components $E_{TE}$ and $E_{TM}$ are multiplied by radome complex transmission coefficients $\tau_{TE}$ and $\tau_{TM}$ to yield field components on a radome wall far side, $E'_{TE}$ and $E'_{TM}$. Field components $E'_{TE}$, $E'_{TM}$ are resolved into co-polarized and cross-polarized components $E_{co}$ and $E_{cross}$. A cross-polarization discrimination ratio $XPD=|E_{co}/E_{cross}|$. Because XPD is a ratio, rigorous normalization of amplitudes of orthogonal field vectors at each stage is unnecessary.

More specifically, $$E_x=\left(\frac{1}{2}\right)\left(-jAe^{-j\phi}+\frac{e^{j\phi}}{A}\right)=\left(\frac{1}{2}\right)\left[\left(\frac{\cos\phi}{A}-A\sin\phi\right)+j\left(\frac{\sin\phi}{A}-A\cos\phi\right)\right] \quad [1]$$

$$E_y=\left(\frac{1}{2}\right)\left(Ae^{-j\phi}+\frac{-je^{j\phi}}{A}\right)=\left(\frac{1}{2}\right)\left[\left(A\cos\phi+\frac{\sin\phi}{A}\right)-j\left(A\sin\phi+\frac{\cos\phi}{A}\right)\right] \quad [2]$$

With no differential attenuator setting (i.e., A=1), equations [1] and [2] reduce to:

$$E_x=\left(\frac{1-j}{2}\right)(\cos\phi-\sin\phi) \quad [3]$$

$$E_y=\left(\frac{1-j}{2}\right)(\cos\phi+\sin\phi) \quad [4]$$

As a check, the cross-polarized component $E_{cross}$ for a desired polarization angle $\psi$ can be derived:

$$E_{cross}=\left(\frac{1-j}{2}\right)[\cos(\phi-\psi)+\sin(\phi-\psi)] \quad [5]$$

It is straightforward to show that $E_{cross}$ becomes zero if $\phi=\psi-45°$.

General fields $E_x$ and $E_y$ incident on the radome can be transformed into incidence plane coordinates:

$$E_{TE}=-E_x\sin\alpha+E_y\cos\alpha \quad [6]$$

$$E_{TM}=E_x\cos\alpha+E_y\sin\alpha \quad [7]$$

The above values are multiplied by radome transmission coefficients to yield fields on far side of radome wall:

$$E'_{TE}=\tau_{TE}E_{TE}=\tau_{TE}(-E_x\sin\alpha+E_y\cos\alpha) \quad [8]$$

$$E'_{TM}=\tau_{TM}E_{TM}=\tau_{TM}(E_x\cos\alpha+E_y\sin\alpha) \quad [9]$$

The above values are resolved into co- and cross-polarized components:

$$E'_{co}=E'_{TM}\cos(\psi-\alpha)+E'_{TE}\sin(\psi-\alpha) \quad [10]$$

$$E'_{cross}=-E'_{TM}\sin(\psi-\alpha)+E'_{TE}\cos(\psi-\alpha) \quad [11]$$

It can be implied from the foregoing equations that:

$$E'_{co}=\tau_{TM}\cos(\alpha-\psi)\lfloor E_x\cos\alpha+E_y\sin\alpha\rfloor+\tau_{TE}\sin(\alpha-\psi)\lfloor -E_y\cos\alpha+E_x\,\alpha\rfloor \quad [12]$$

$$E'_{cross}=\tau_{TE}\cos(\alpha-\psi)\lfloor E_y\cos\alpha+E_x\sin\alpha\rfloor+\tau_{TM}\sin(\alpha-\psi)\lfloor E_x\cos\alpha=E_y\sin\alpha\rfloor \quad [13]$$

and therefore $$XPD=\left|\frac{E'_{co}}{E'_{cross}}\right|=\frac{\tau_{TM}\cos(\alpha-\psi)\lfloor E_x\cos\alpha+E_y\sin\alpha\rfloor+\tau_{TE}\sin(\alpha-\psi)\lfloor -E_y\cos\alpha+E_x\sin\alpha\rfloor}{\tau_{TE}\cos(\alpha-\psi)[E_y\cos\alpha-E_x\sin\alpha]+\tau_{TM}\sin(\alpha-\psi)[E_x\cos\alpha+E_y\sin\alpha]} \quad [14]$$

It can be easily shown that by combining equations [1] and [2] with equation [14], an equation for the radome XPD in terms of phase shifter and attenuator settings ($\phi$ and A respectively) is obtained. Phase shifter and attenuator settings are obtained by numerical minimization of an equation for 1/XPD with respect to $\phi$ and A.

In one embodiment and referring to FIG. 2, a differential amplitude and a differential phase between signals in channels 222 and 224 are determined, that, when applied to the signals, would compensate for depolarization induced by the radome 206. These radome depolarization offsets are combined with amplitude and/or phase settings applied by the apparatus 200 as described above. A plurality of radome depolarization offsets can be predetermined, for example, for a plurality of elevation angle and azimuth angle pairs (referred to herein as pointing angle pairs) of a scan range of the antenna aperture 276, and stored in a table, for example, in the processor 204 as described above. Scan range dimensions can be used to determine table spacing. For example, 10° spacing could be provided for both elevation and azimuth. Thus, for an elevation scanning range of 90° and an azimuth scanning range of 180°, a total number of entries in a table could be, for example, 10×19=190 entries.

It should be readily understood that table entries can be spaced and determined in a plurality of ways. For example, in some cases it has been observed in relation to small incidence angles (e.g., angles of incidence below an approximate limit of between 20° and 30°) that table errors can result in degradation of radome cross-polarization. In such a case, radome depolarization compensation could be improved by placing zeros in compensation table entries corresponding to such angles of incidence.

In other embodiments, such a table can have more than two dimensions. For example, each table entry could correspond to a pointing angle pair and a desired polarization angle. As another example, each table entry could correspond to a pointing angle pair and a signal frequency. Generally, it can be seen that a table of offsets could be defined in a plurality of ways and could include a plurality of variables affecting signal transmission. Table data can be derived by calculation. In a preferred embodiment, table data are measured from a particular radome.

As described above, for a specified pointing angle pair (and a specified desired plane of polarization in an embodiment in which the table 284 includes angle of the plane of polarization as a variable), adjustments for attenuators 238 and phase shifters 242 are determined which cancel wave depolarization induced by the radome 206. As previously stated above, the processor 204 can compute interpolated values. For example, where a signal is transmitted through the antenna aperture 276 at a pointing angle not represented in a pointing angle pair in the table 284, the processor 204 uses offset values stored in two or more table entries to calculate a new offset value.

Figure 4:
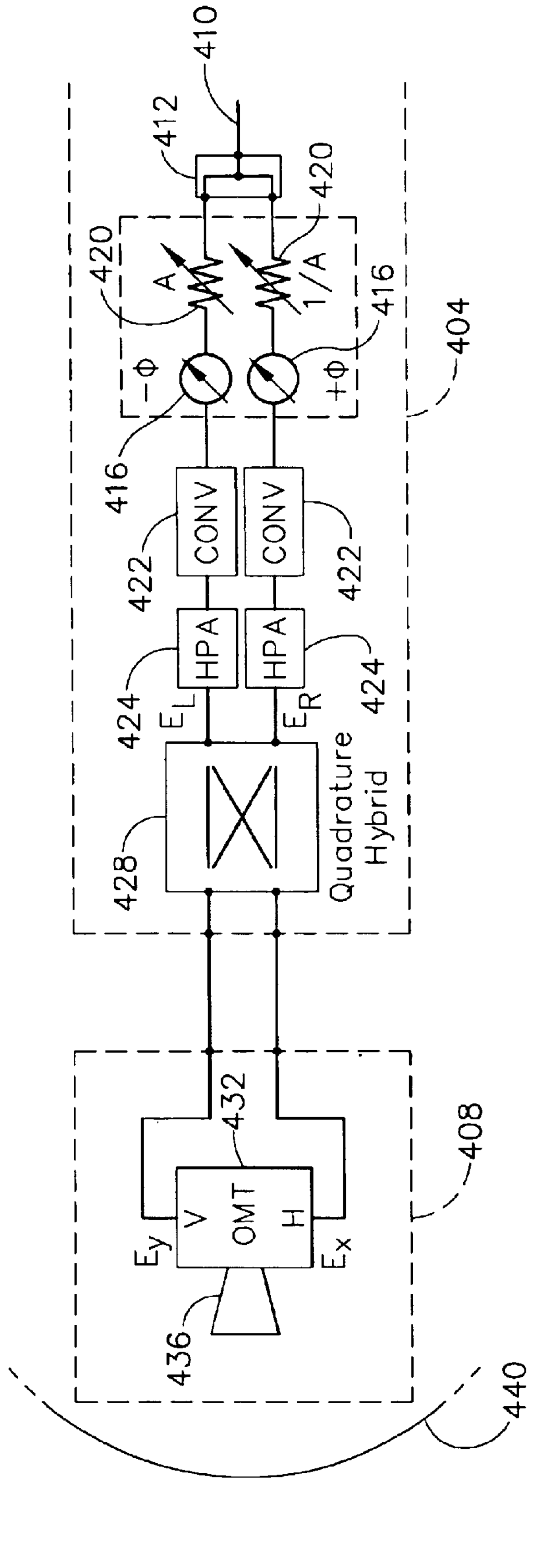
FIG. 4 is a block diagram of a radome depolarization compensation apparatus according to one embodiment of the present invention.

Embodiments of the present invention can be practiced in connection with intermediate frequency (IF) signals. For example, an apparatus that provides radome depolarization compensation according to another embodiment is indicated generally in FIG. 4 by reference number 400. Although the apparatus 400 is described below in the context of signal transmission, the apparatus 400 compensates in another embodiment for radome depolarization of a received signal. In yet another embodiment, the polarization control apparatus shown in FIG. 4 compensates for depolarization of signals on both sides of a radome, i.e., the apparatus 400 compensates for radome depolarization of both transmitted and received signals.

The apparatus 400 includes a control unit 404 that delivers signals, e.g., for transmission through an antenna aperture 408. An IF signal entering the apparatus 400 at a port 410 is divided by a divider 412 into left-handed and right-handed circularly polarized (LHCP and RHCP) signals $E_L$ and $E_R$. The signals $E_L$ and $E_R$ are adjusted, via phase shifters 416 and attenuators 420, using offset(s) for radome depolarization as previously described with reference to FIG. 1.

The signals $E_L$ and $E_R$ are upconverted to radio frequency (RF) via converters 422, boosted by high-power amplifiers 424 and linearly polarized via a quadrature hybrid 428. Vertical and horizontal signals $E_y$ and $E_x$ are transmitted to an ortho-mode transducer 432 and transmitted through an antenna horn 436. As the signals are transmitted, they pass through a radome 440. In an embodiment wherein a signal is received, the converters 422 downconvert the incoming signal from RF to IF. Up- and/or down-converters 422 preferably are matched in amplitude and phase over temperature, frequency and dynamic range.

Figure 5:
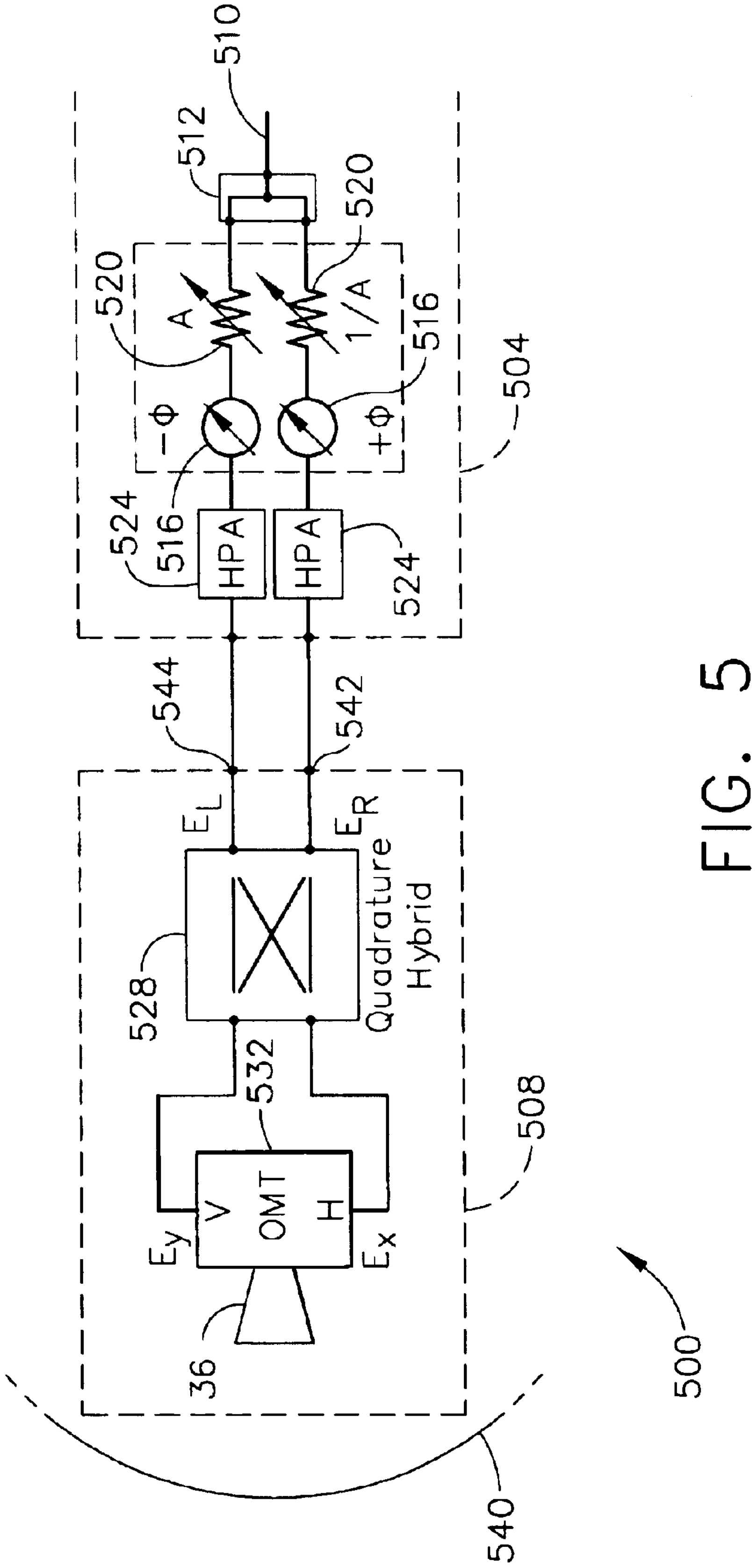
FIG. 5 is a block diagram of a radome depolarization compensation apparatus according to one embodiment of the present invention.

Another embodiment of a radome depolarization compensation apparatus is indicated generally in FIG. 5 by reference number 500. The apparatus 500 includes a control unit 504 that delivers signals, e.g., for transmission through an antenna 508. A signal entering the control unit 504 at a port 510 is divided by a divider 512 into left-handed and right-handed circularly polarized (LHCP and RHCP) signals $E_L$ and $E_R$. The signals $E_L$ and $E_R$ are adjusted, via phase shifters 516 and attenuators 520, using offset(s) for radome depolarization as previously described with reference to FIG. 1.

The signals $E_L$ and $E_R$ are boosted by high-power amplifiers 524 and transmitted to the antenna 508, wherein the signals are linearly polarized via a quadrature hybrid 528. Vertical and horizontal signals $E_y$ and $E_x$ are transmitted to an ortho-mode transducer (OMT) 532 and transmitted through an antenna horn 536. As the signals are transmitted, they pass through a radome 540. In the embodiment shown in FIG. 5, the quadrature hybrid 528 is included in the antenna 508, thereby allowing the antenna 508 to function as a dual circularly polarized antenna having RHCP and LHCP ports 542 and 544.

It should be noted, however, that the control unit 504 can be used with any dual circularly polarized antenna, including an antenna that does not use a quadrature hybrid in generating circular polarization. Such an antenna could have, for example, a waveguide polarizer in a reflector antenna feed system, between feed horn and OMT. Another such antenna could have a plane wave or free space polarizer sheet across a feed horn aperture or reflector aperture. It also should be noted generally that embodiments of the present invention also are contemplated for use with one or more array antennas in addition to or instead of reflector antennas.

Figure 6:
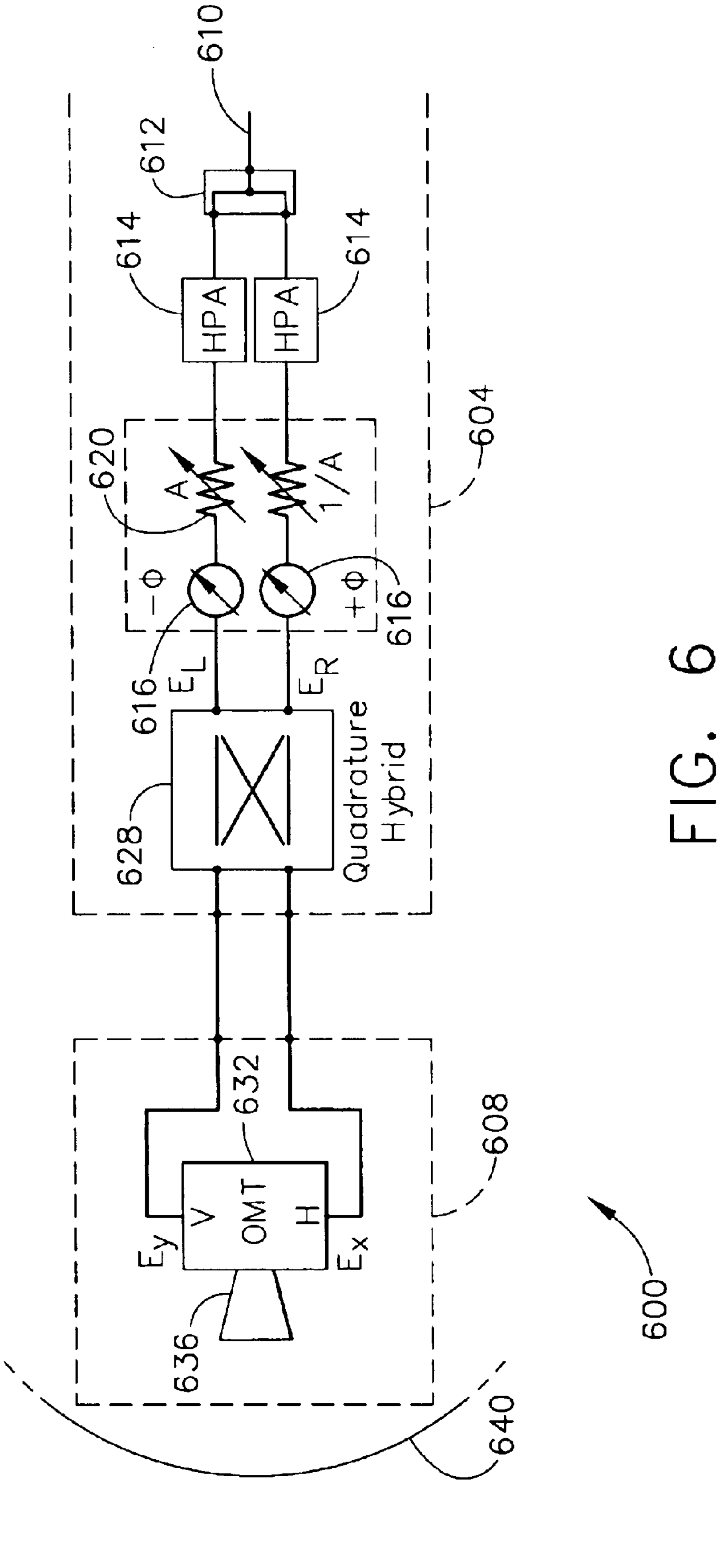
FIG. 6 is a block diagram of a radome depolarization compensation apparatus according to one embodiment of the present invention.

Another embodiment of a radome depolarization compensation apparatus is indicated generally in FIG. 6 by reference number 600. The apparatus 600 includes a control unit 604 that delivers signals, e.g., for transmission through an antenna 608. A signal entering the apparatus 600 at a port 610 is divided by a divider 612 into left-handed and right-handed circularly polarized (LHCP and RHCP) signals $E_L$ and $E_R$.

The signals $E_L$ and $E_R$ are are boosted by high-power amplifiers 614 and adjusted, via phase shifters 616 and attenuators 620, using offset(s) for radome depolarization as previously described. The phase shifters 616 and attenuators 620 are configured as high-power components, i.e., configured to handle input from the high-power amplifiers 614. The signals $E_L$ and $E_R$ are linearly polarized via a quadrature hybrid 628. Vertical and horizontal signals $E_y$ and $E_x$ are transmitted to an ortho-mode transducer 632 and transmitted through an antenna horn 636. As the signals are transmitted, they pass through a radome 640.

The amplifiers 614 preferably are matched in amplitude and phase over applicable temperature, frequency, and dynamic ranges. For relatively small levels of radome depolarization, the amplifiers 614 of the apparatus 600 tend to operate nominally at the same level. As radome depolarization increases, a difference between attenuator settings may also increase, which may tend to increase any imbalance in drive levels for the amplifiers 614.

Figure 7:
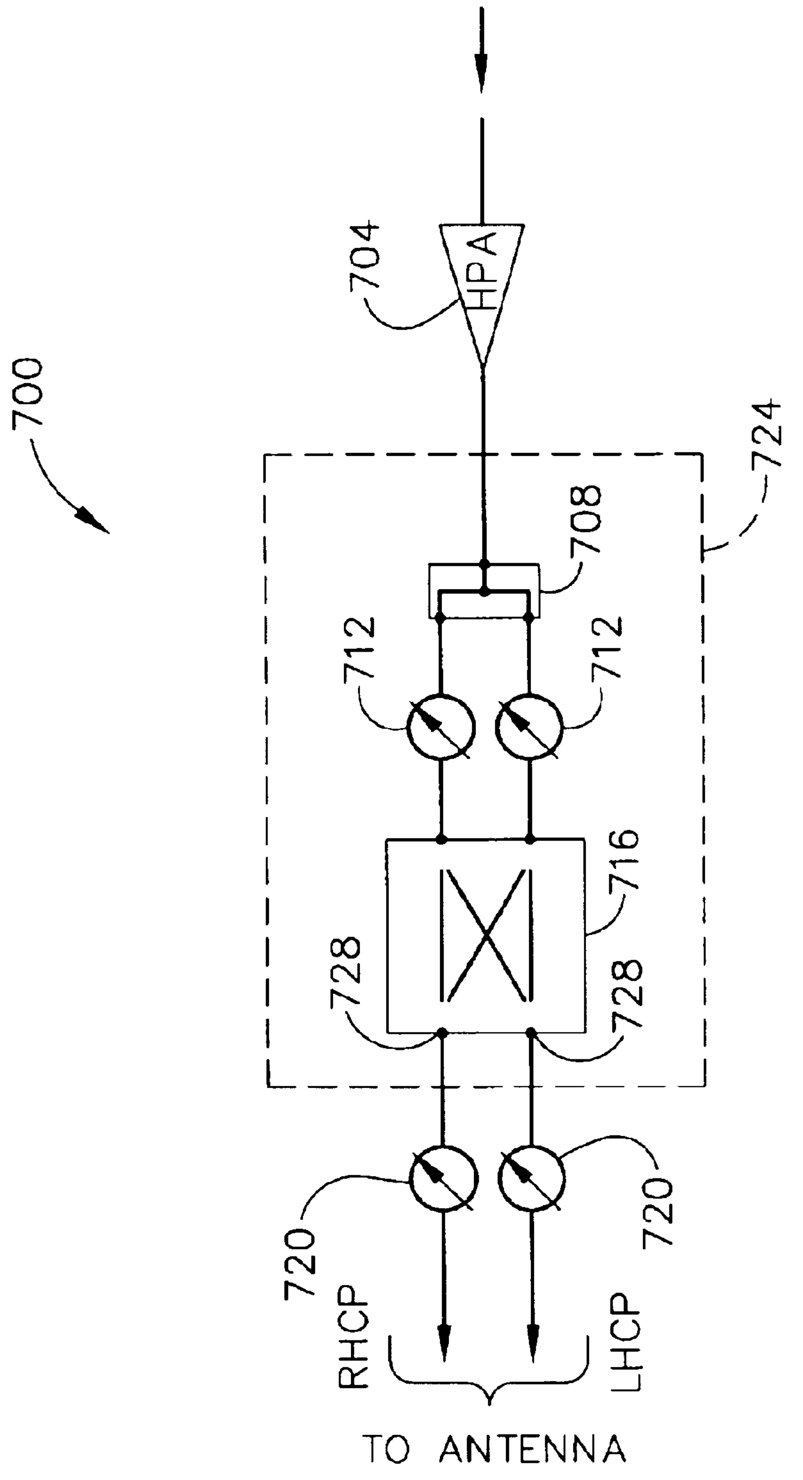
FIG. 7 is a block diagram of a radome depolarization compensation apparatus according to one embodiment of the present invention.

Another embodiment of a depolarization compensation apparatus is indicated generally in FIG. 7 by reference number 700. A transmission signal is amplified by a high-power amplifier 704 and enters a power divider 708. The divided signals are phase-shifted via phase shifters 712, transmitted through a three-decibel (3 dB) hybrid 716, and are phase shifted via phase shifters 720.

The phase shifters 720 are used to adjust a phase difference between the two signals in a manner similar to that in which phase shifters 116 (shown in FIG. 1) are used. Phase shifters 712, together with the 3 dB hybrid 716, perform as a variable power divider 724. A differential phase shift between the phase shifters 712 can be adjusted to adjust a power division ratio at output ports 728 of the hybrid 716. Changing losses through the phase shifters 720 can be compensated for by correcting the settings of the variable power divider 724.

In an antenna system embodiment configured in accordance with the foregoing principles, signals having substantially pure linear polarization with a high cross-polarization discrimination ratio (XPD) can be radiated. As an example, for a typical system the antenna XPD is 17.0 dB and the uncompensated radome XPD is 7.9 dB, so that the total system (antenna plus radome) XPD at the (1−σ) level is 5.7 dB. Where radome depolarization compensation is applied as described above, and errors in the compensation offset tables are 5° in phase and 0.3 dB in amplitude at the (1−σ) level, then the radome XPD is improved from 7.9 dB to 24.9 dB, and the total system XPD is improved from 5.7 dB to 14.5 dB (all values at the (1−σ) level).

In other embodiments of the present invention, radome depolarization compensation is performed in connection with antenna systems operating with circular polarization. Derivation of depolarization compensation for circular polarization shall be described with reference to the coordinate system shown in FIG. 3. It is assumed in the following description that a radome-covered antenna aperture is dual-linear polarized and has two orthogonally-polarized ports exciting horizontal and vertical radiated polarizations which are parallel to the x and y-axes respectively. (Such polarizations do not necessarily need to be vertical and horizontal, and need only be orthogonal.) Transmit mode analysis is assumed. It also is assumed that the excitations of the two antenna ports by a depolarization controller connected to the antenna aperture are $e_x$ and $e_y$.

Where the local plane of incidence at the radome surface is oriented at an angle α to the x-axis, the fields at the radome surface, transformed to a coordinate system aligned to the local plane of incidence are:

$$e_{TM}=e_x \cos\alpha+e_y \sin\alpha \quad [15]$$

$$e_{TE}=-e_x \sin\alpha+e_y \cos\alpha \quad [16]$$

Note that rigorous normalization of "excitations" from voltages or currents, prior to the antenna feed ports to fields radiated by the antenna and transmitted through the radome, is not implemented, as the solutions herein are all in terms of excitation ratios.

Assume that the radome has local transmission coefficients $\tau_{TM}$ and $\tau_{TE}$ for fields parallel to the transverse magnetic (TM) and transverse electric (TE) directions respectively. The radiated fields on the far side of the radome then become:

$$e'_{TM}=\tau_{TM}e_{TM} \quad [17]$$

$$e'_{TE}=\tau_{TE}e_{TE} \quad [18]$$

These radiated field components may be resolved into Right Hand Circular Polarization (RHCP) and Left Hand Circular Polarization (LHCP) components:

$$e'_{RHCP}=\frac{1}{\sqrt{2}}(e'_{TM}+je'_{TE})=\frac{e_x}{\sqrt{2}}(\tau_{TM}\cos\alpha-j\tau_{TE}\sin\alpha)+\frac{e_y}{\sqrt{2}}(\tau_{TM}\sin\alpha+j\tau_{TE}\cos\alpha) \quad [19]$$

$$e'_{LHCP}=\frac{1}{\sqrt{2}}(je'_{TM}+e'_{TE})=\frac{e_x}{\sqrt{2}}(j\tau_{TM}\cos\alpha-\tau_{TE}\sin\alpha)+\frac{e_y}{\sqrt{2}}(j\tau_{TM}\sin\alpha+\tau_{TE}\cos\alpha) \quad [20]$$

To radiate pure RHCP, solve for $e'_{LHCP}=0$:

$$\frac{e_x}{e_y}=\frac{j\tau_{TM}\sin\alpha+\tau_{TE}\cos\alpha}{\tau_{TE}\sin\alpha+j\tau_{TE}\cos\alpha} \quad [21]$$

The foregoing equation for the complex ratio $e_x/e_y$ defines the excitations at the two orthogonal antenna ports which a depolarization compensation apparatus generates in order to compensate for the radome depolarization, and radiate a pure RHCP wave.

As a check, if the radome has zero depolarization ($\tau_{TM}=\tau_{TE}$), this becomes:

$$\frac{e_y}{e_x}=-j \quad [22]$$

That is, the two antenna ports are fed with equal amplitude excitations which are in phase quadrature, as expected.

When the radome depolarization becomes finite due to imbalance between either the amplitudes and/or the phases of the TM and TE radome transmission coefficients, the excitation ration $e_x/e_y$ diverges from the above result, for which adjustment is made in both amplitude and phase.

It is notable that, in contrast to compensation for linear polarization, for which amplitude and phase imbalances between the radome transmission coefficients can entail phase and amplitude adjustments respectively via a depolarization compensation apparatus, for circular polarization compensation either amplitude or phase imbalances between the radome transmission coefficients entail both amplitude and phase adjustment.

Figure 8:
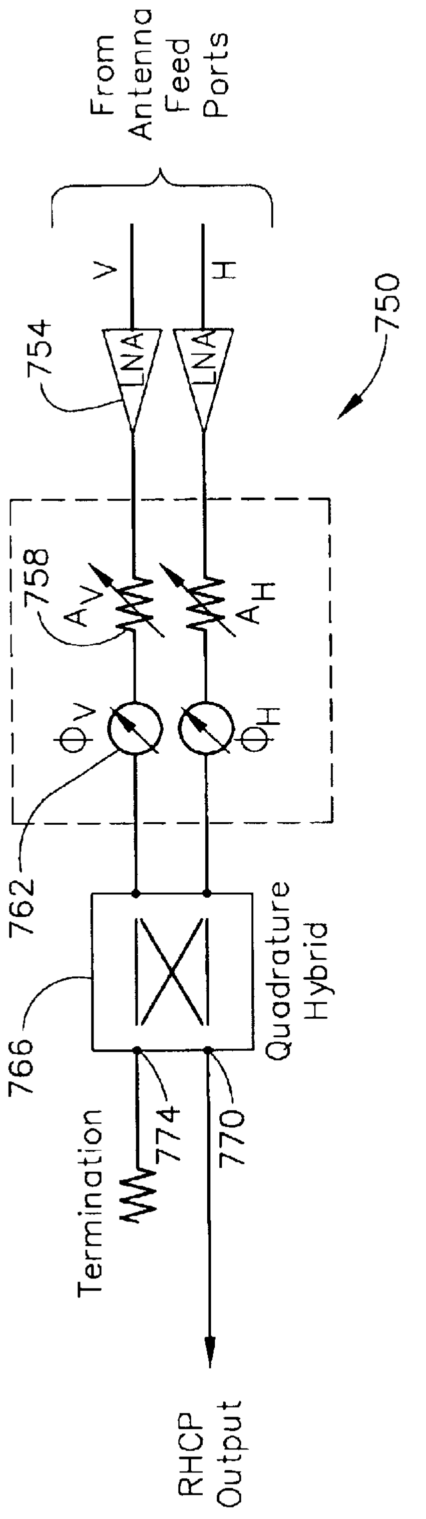
FIG. 8 is a block diagram of a radome depolarization compensation apparatus according to one embodiment of the present invention.

An exemplary embodiment of an apparatus for compensating for depolarization for a received signal is indicated generally in FIG. 8 by reference number 750. Orthogonal signals from antenna feed ports (not shown) pass through low-noise amplifiers 754, variable attenuators 758, phase shifters 762 and a quadrature hybrid 766. The amplifiers 754 establish a system noise figure prior to the attenuators 758 and phase shifters 762, to prevent system G/T (gain/temperature) degradation from any losses in the attenuators 758 and phase shifters 762. The attenuators 758 and phase shifters 762 adjust polarization of the signals: the phase shifters 762 adjust phase, and the attenuators 758 adjust amplitude. Where radome depolarization is zero, pure RHCP is obtained at a port 770 by setting $\phi_V=\phi_H$ and $A_V=A_H$. A second port 774 of the quadrature hybrid 766 is terminated in the present embodiment. In another embodiment, the port 774 could transmit a LHCP signal.

Figure 9:
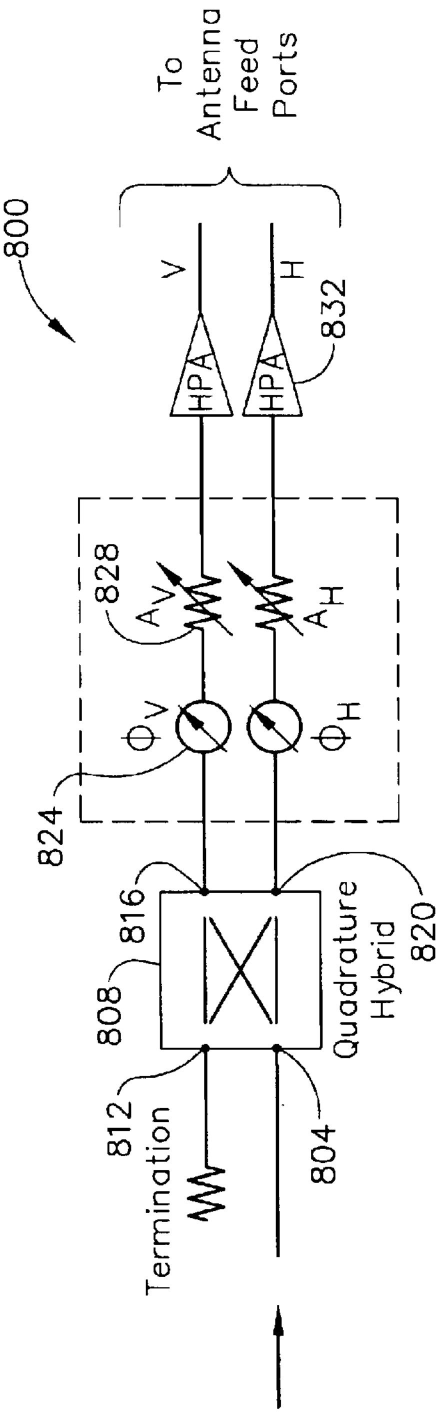
FIG. 9 is a block diagram of a radome depolarization compensation apparatus according to one embodiment of the present invention.

An embodiment of an apparatus for compensating for depolarization for a transmitted signal is indicated generally in FIG. 9 by reference number 800. A low-level transmit signal enters a port 804 of a quadrature hybrid 808 having a terminated port 812. A pair of signals are transmitted from hybrid ports 816 and 820 and pass through phase shifters 824 and attenuators 828. The signals are amplified via high power amplifiers 832, which are calibrated or matched in amplitude and phase over applicable temperature, frequency and dynamic ranges. For small levels of radome depolarization, the amplifiers 832 are operated at about the same level.

In the embodiment shown in FIG. 9, signals output by the phase shifters 824 and attenuators 828 are input to the amplifiers 832. In an alternative embodiment (not shown), the positions of the phase shifters 824 and attenuators 828 and amplifiers 832 are reversed, such that signals output by the amplifiers 832 are input to the phase shifters 824 and attenuators 828. In such an embodiment, the phase shifters 824 and attenuators 828 are high-power components, and transmit power may be lower in comparison to power available via the embodiment shown in FIG. 9. In yet another embodiment, a tee-splitter may be used in place of the quadrature hybrid 808, and thus phase shifters may be used that have a wider phase range than that of the phase shifters 824 shown in FIG. 9.

Figure 10:
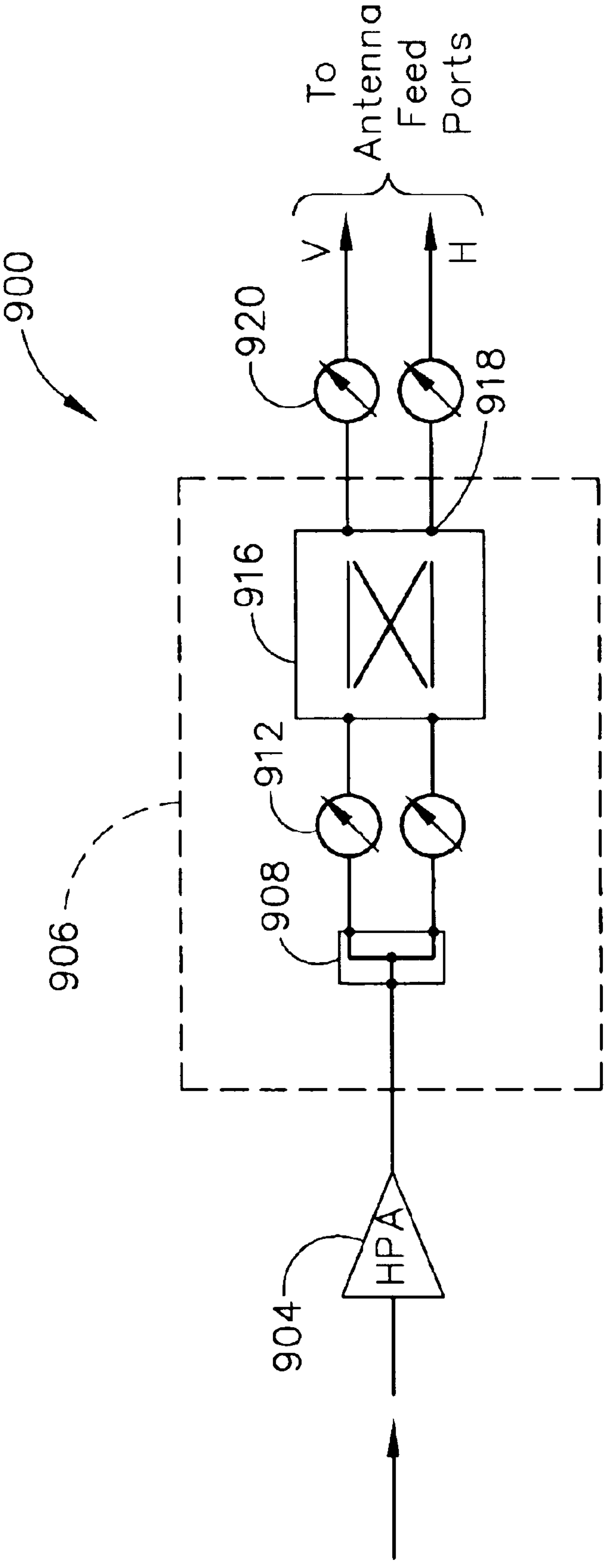
FIG. 10 is a block diagram of a radome depolarization compensation apparatus according to one embodiment of the present invention.

Another embodiment of an apparatus for compensating for depolarization for a transmitted signal is indicated generally in FIG. 10 by reference number 900. A low-level transmit signal passes through a high power amplifier 904 and a variable power divider 906 formed by a power divider 908, phase shifters 912 and a three-decibel (3 dB) hybrid 916. The variable power divider 906 performs in the same or a similar manner as attenuators, e.g., the attenuators 828 shown in FIG. 9. Adjustment of a differential phase shift between the phase shifters 912 adjust a power division ratio at output ports 918 of the 3 dB hybrid 916. A pair of phase shifters 920 adjust a phase difference between the two signals. Any changing losses through phase shifters 920 can be compensated for by adjusting the settings of the variable power divider 906.

Embodiments of the foregoing methods and apparatus can be used for radome depolarization compensation in both transmit and receive modes of operation. In some embodiments, existing hardware in an antenna system can be used in implementing radome depolarization compensation. Signal depolarization induced by an existing radome can be reduced or eliminated without sophisticated high-cost radome redesign.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of reducing depolarization of a wireless signal passing through an antenna radome, comprising:

determining an angle of incidence of the signal relative to the radome;

from said determined angle of incidence, determining at least one offset to signal depolarization induced by the radome; and applying the at least one offset to the signal to reduce depolarization of the signal.

2. The method of claim 1, wherein the applying is based on at least one pointing angle of the antenna.

3. The method of claim 1, further comprising applying the offset to the signal based on a desired polarization angle of the signal.

4. The method of claim 1, further comprising:

storing the at least one offset in a memory; and retrieving the at least one offset from the memory based on at least one pointing angle of the antenna.

5. The method of claim 1, wherein applying the offset comprises interpolating among a plurality of offsets.

6. The method of claim 1, wherein determining at least one offset is performed relative to a selected signal frequency.

7. The method of claim 1, wherein determining at least one offset comprises using an angle of signal incidence to determine a radome transmission coefficient.

8. The method of claim 1, wherein determining at least one offset comprises minimizing a cross-polarization discrimination ratio (XPD) in accordance with $$XPD = \left|\frac{E'_{co}}{E'_{cross}}\right| = \frac{\tau_{TM}\cos(\alpha-\psi)\lfloor E_x\cos\alpha + E_y\sin\alpha\rfloor + \tau_{TE}\sin(\alpha-\psi)\lfloor -E_y\cos\alpha + E_x\sin\alpha\rfloor}{\tau_{TE}\cos(\alpha-\psi)[E_y\cos\alpha - E_x\sin\alpha] + \tau_{TM}\sin(\alpha-\psi)[E_x\cos\alpha + E_y\sin\alpha]}$$

where $\tau_{TE}$ and $\tau_{TM}$ are radome transmission coefficients, $\alpha$ is an angle of incidence and $\psi$ is a desired polarization angle.

9. The method of claim 1, wherein determining at least one offset comprises minimizing a cross-polarization discrimination ratio (1/XPD) in accordance with $$XPD = \left|\frac{E'_{co}}{E'_{cross}}\right| = \frac{\tau_{TM}\cos(\alpha-\psi)\lfloor E_x\cos\alpha + E_y\sin\alpha\rfloor + \tau_{TE}\sin(\alpha-\psi)\lfloor -E_y\cos\alpha + E_x\sin\alpha\rfloor}{\tau_{TE}\cos(\alpha-\psi)[E_y\cos\alpha - E_x\sin\alpha] + \tau_{TM}\sin(\alpha-\psi)[E_x\cos\alpha + E_y\sin\alpha]}$$

where $\tau_{TE}$ and $\tau_{TM}$ are radome transmission coefficients, $\alpha$ is an angle of incidence and $\psi$ is a desired polarization angle.

10. The method of claim 1, wherein applying the offset comprises combining at least one of an amplitude offset and a phase offset with the signal.

11. The method of claim 1, wherein determining at least one offset comprises resolving radiated field components of the signal into RHCP and LHCP components.

12. The method of claim 11, wherein determining at least one offset further comprises determining excitations $e_x$ and $e_y$ at ports of the antenna in accordance with $$\frac{e_x}{e_y} = \frac{j\tau_{TM}\sin\alpha + \tau_{TE}\cos a}{\tau_{TE}\sin\alpha + j\tau_{TE}\cos a}$$

where where $\tau_{TE}$ and $\tau_{TM}$ are radome transmission coefficients and $\alpha$ is an angle of incidence.

13. The method of claim 1, further comprising converting between a radio frequency of the signal and an intermediate frequency using one of a downconverter and an upconverter.

14. A method of compensating for depolarization of a signal passing through an antenna radome, comprising:

dividing the signal into a plurality of polarized signals; and applying, to at least one of the polarized signals, at least one offset predetermined based on a difference between a tranverse magnetic (TM) transmission coefficient and a transverse electric (TE) coefficient of the radome, the at least one offset configured to cancel depolarization attributable to the difference.

15. The method of claim 14, wherein the polarized signals include at least one circularly polarized signal.

16. The method of claim 14, wherein applying at least one offset comprises determining an offset to one of a differential amplitude between the polarized signals and a differential phase between the polarized signals.

17. The method of claim 14, further comprising using the TM and TE transmission coefficients to determine a cross-polarization ratio (XPD); and minimizing an inverse of the cross-polarization ratio to determine the at least one offset.

18. The method of claim 14, wherein applying is performed periodically during movement of the antenna.

19. The method of claim 14, wherein applying at least one offset comprises interpolating among a plurality of predetermined amplitude offsets to determine the at least one offset.

20. The method of claim 14, wherein applying at least one offset comprises interpolating among a plurality of predetermined phase offsets to determine the at least one offset.

21. The method of claim 14, wherein the applying is performed on one side of the radome to compensate for depolarization on another side of the radome.

22. The method of claim 14, wherein the applying is performed on one side of the radome to compensate for depolarization on the same side of the radome.

23. The method of claim 14, further comprising determining a transmission coefficient of the radome for an angle of incidence and frequency of the signal at the radome.

24. The method of claim 14, further comprising using at least one offset value stored in a memory to determine a differential amplitude and phase.

25. An apparatus for compensating for depolarization of a wireless signal attributable to passage of the signal through an antenna radome, the signal entering the apparatus as a plurality of oppositely polarized signals, the apparatus comprising:

an applicator circuit including a plurality of phase shifters having settings configured to shift phases of the oppositely polarized signals to generate polarization of the wireless signal at a desired polarization angle; and a processor in communication with the applicator circuit and configured to determine at least one offset to the polarized signals that compensates for depolarization induced by the radome;

the processor further configured to adjust one or more of the phase shifter settings to apply the at least one offset to at least one of the polarized signals to reduce depolarization of the wireless signal.

26. The apparatus of claim 25, wherein the processor is further configured to determine the offset based on at least one transmission coefficient of the radome.

27. The apparatus of claim 25, wherein the processor is further configured to use a desired plane of polarization of the wireless signal to determine the offset.

28. The apparatus of claim 25, wherein the applicator circuit comprises at least one phase shifter and at least one attenuator in series with the phase shifter.

29. The apparatus of claim 25, wherein the applicator circuit comprises a pair of phase shifters and a variable power divider connected with the phase shifters.

30. The apparatus of claim 29, wherein the variable power divider comprises a three decibel hybrid, a second pair of phase shifters connected with the hybrid, and a power divider connected with the second pair of phase shifters.

31. An antenna system comprising:

a radome through which a wireless signal is configured to pass;

a polarizer circuit configured to divide the wireless signal into oppositely polarized signals;

a processor configured to determine at least one offset to at least one of the polarized signals based on a difference between transverse electric and transverse magnetic transmission coefficients ($\tau_{TE}$ and $\tau_{TM}$) of the radome; and an applicator circuit configured to apply the at least one offset to at least one of the polarized signals to cancel depolarization attributable to the difference.

32. The antenna system of claim 31, wherein the processor is further configured to use a desired plane of polarization of the wireless signal to determine the offset.

33. The antenna system of claim 31, wherein the applicator circuit comprises at least one phase shifter and at least one attenuator in series with the phase shifter.

34. The antenna system of claim 31, further configured to transmit the wireless signal.

35. The antenna system of claim 31, further configured to receive the wireless signal.

36. A polarization controller for controlling polarization of a wireless signal passing through an antenna having a radome, the controller comprising a signal divider that divides the signal into oppositely polarized signals, an adjustment circuit that varies a differential phase shift to the polarized signals in accordance with a desired linear polarization plane orientation angle, and at least one processor configured to:

determine an angle of incidence of the wireless signal relative to the radome;

determine, from the determined angle of incidence, at least one offset to cancel an imbalance between transverse electric (TE) and transverse magnetic (TM) components of the wireless signal induced by the radome; and control the adjustment circuit so as to vary the differential phase shift to apply the offset to the polarized signals.

37. A method of reducing depolarization of a wireless signal passing through an antenna radome, comprising:

determining an angle of incidence of the signal relative to the radome;

from said determined angle of incidence, determining at least one offset to signal depolarization attributable to the radome; and applying the offset to the signal to reduce depolarization of the signal; wherein determining at least one offset comprises minimizing a cross-polarization discrimination ratio (XPD) in accordance with $$XPD = \left|\frac{E'_{co}}{E'_{cross}}\right| = \frac{\tau_{TM}\cos(\alpha-\psi)\lfloor E_x\cos\alpha + E_y\sin\alpha\rfloor + \tau_{TE}\sin(\alpha-\psi)\lfloor -E_y\cos\alpha + E_x\sin\alpha\rfloor}{\tau_{TE}\cos(\alpha-\psi)[E_y\cos\alpha - E_x\sin\alpha] + \tau_{TM}\sin(\alpha-\psi)[E_x\cos\alpha + E_y\sin\alpha]}$$

where $\tau_{TE}$ and $\tau_{TM}$ are radome transmission coefficients, $\alpha$ is an angle of incidence and $\psi$ is a desired polarization angle.

38. A method of reducing depolarization of a wireless signal passing through an antenna radome, comprising:

determining an angle of incidence of the signal relative to the radome;

from said determined angle of incidence, determining at least one offset to signal depolarization attributable to the radome; and applying the offset to the signal to reduce depolarization of the signal;

wherein determining at least one offset comprises:

resolving radiated field components of the signal into RHCP and LHCP components; and determining excitations $e_x$ and $e_y$ at ports of the antenna in accordance with $$\frac{e_x}{e_y} = \frac{j\tau_{TM}\sin\alpha + \tau_{TE}\cos a}{\tau_{TE}\sin\alpha + j\tau_{TE}\cos a}$$

where where $\tau_{TE}$ and $\tau_{TM}$ are radome transmission coefficients and $\alpha$ is an angle of incidence.

39. An apparatus for compensating for depolarization of a wireless signal attributable to passage of the signal through an antenna radome, the signal entering the apparatus as a plurality of oppositely polarized signals, the apparatus comprising:

a processor configured to determine at least one offset to the polarized signals that compensates for depolarization attributable to the radome; and an applicator circuit configured to apply the offset to at least one of the polarized signals, the applicator circuit comprising a pair of phase shifters and a variable power divider connected with the phase shifters;

wherein the variable power divider comprises a three decibel hybrid, a second pair of phase shifters connected with the hybrid, and a power divider connected with the second pair of phase shifters.

* * * * *